United States Patent [19]
Vail

[11] 3,790,876
[45] Feb. 5, 1974

[54] PAPER CUTTING MACHINE
[75] Inventor: Robert W. Vail, Newport Beach, Calif.
[73] Assignee: Rockwell International Corporation, Pittsburgh, Pa.
[22] Filed: Feb. 15, 1973
[21] Appl. No.: 332,732

[52] U.S. Cl.............................. 318/603, 235/151.11
[51] Int. Cl. .......................................... G05b 19/28
[58] Field of Search................ 318/603; 235/151.11

[56] References Cited
UNITED STATES PATENTS
3,566,239  2/1971  Taniguchi...................... 318/603 X
3,715,645  2/1973  Pettavel............................ 318/603
3,646,419  2/1972  Holy................................... 318/603
3,646,890  3/1972  Snyder........................... 318/603 X Primary Examiner—B. Dobeck

[57] ABSTRACT

An improved paper cutting machine is provided with a novel servo control system for repeatedly, precisely positioning the machine movable backgauge assembly at different intermediate positions in its total length of traverse. The control system utilizes conventional command signals and also feedback signals which provide binary-coded position information associated only with key control positions established at selected intervals in the backgauge total traverse and pulsed counting information for incremental position changes in each interval between the key control positions.

4 Claims, 9 Drawing Figures

Fig. 2

PATENTED FEB 5 1974 3,790,876

| CIRCUMFERENTIAL POSITION | RADIAL POSITION | | | | |
|---|---|---|---|---|---|
| | A | B | C | D | E |
| 0° | 0 | 0 | 0 | 0 | 0 |
| 36° | 0 | 0 | 0 | 0 | 0 |
| 72° | 0 | 0 | — | 0 | 0 |
| 108° | 0 | 0 | — | — | 0 |
| 144° | 0 | — | 0 | 0 | 0 |
| 180° | 0 | — | 0 | 0 | 0 |
| 216° | 0 | — | — | 0 | 0 |
| 252° | 0 | 0 | 0 | 0 | 0 |
| 288° | — | 0 | 0 | 0 | 0 |
| 324° | — | 0 | 0 | — | 0 |

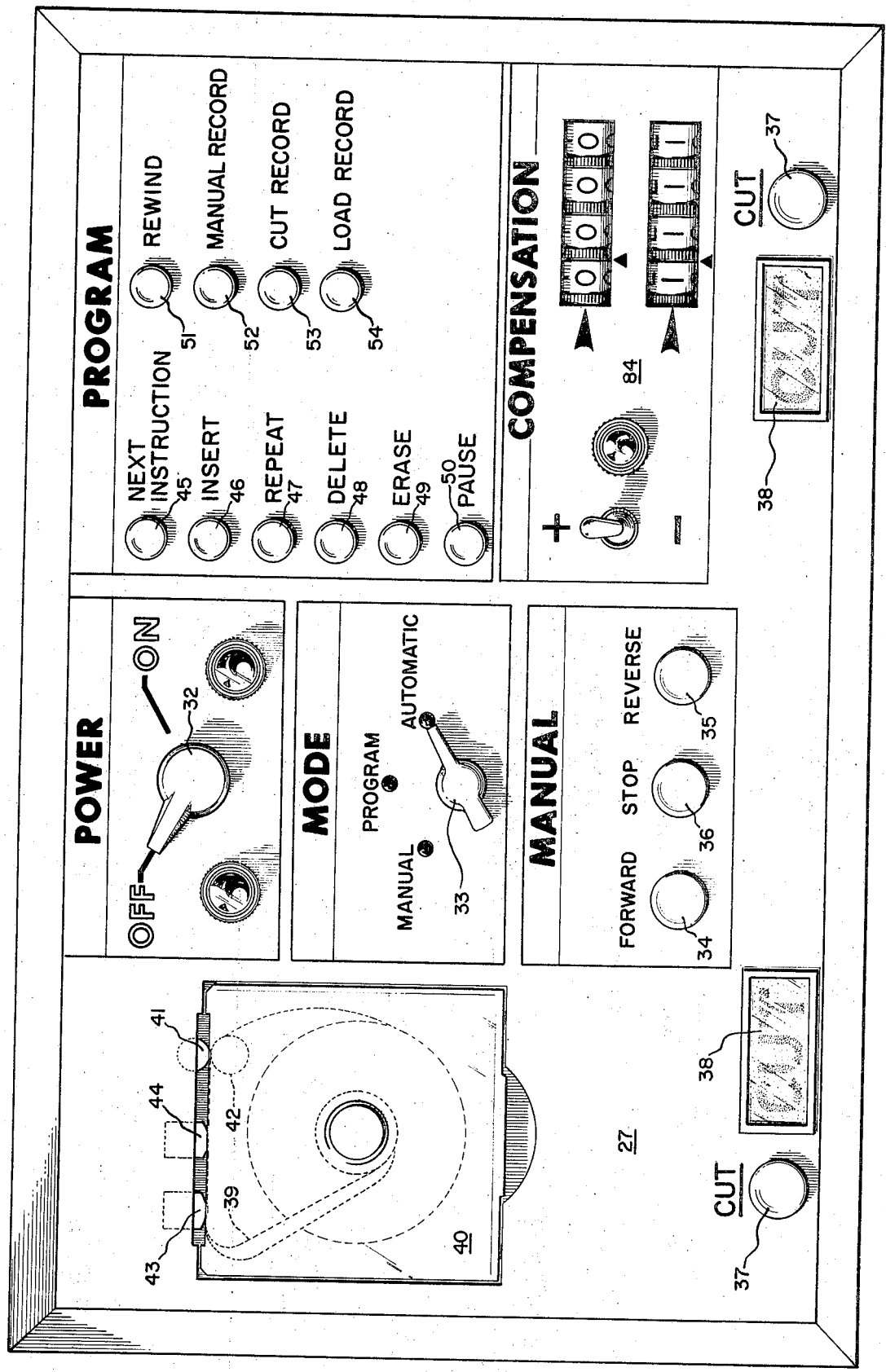

PAPER CUTTING MACHINE

SUMMARY OF THE INVENTION

A paper cutting machine having conventional guillotine cutter, backgauge, and backgauge drive elements is provided with a novel programmable control system having servo means and methods of operation which obtain improved repeatability of precise positioning in the backgauge total length of traverse. Command signals for the servo system are provided in binary-coded digital form from an inserted programmable magnetic tape loop. Feedback signals for the servo system, which is a closed loop system, are derived from a feedback signal generator operatively connected to the backgauge drive means and to a digital counter and digital comparator. The feedback signal generator develops binary-coded position signals associated with key control positions only, normally uniformly spaced throughout the backgauge length of traverse, and counting pulse signals associated with uniformly spaced incremental position changes in each interval between adjacent key control positions. The control system functions to compare the total of accumulated counting pulse signals in the counter at each key control position with the binary-coded signal indicating backgauge presence at the key control position and, if there is any difference, to increment or decrement the counter to registration with the key control position. Position control for cutting operations involve null balancing of the counter output with the command signal. By precisely developing the binary-coded key control position signals in the backgauge total traverse length and by incrementing/decrementing the intermediate position counting pulse counter at each key control position, improved repeatable position accuracy is developed for the backgauge of the paper cutting machine.

In one embodiment of the invention, the feedback signal and servo control system precisely and repeatably control the position of a cutting machine backgauge over a total linear movement range of 100 inches in increments of 0.001 inches.

DESCRIPTION OF THE DRAWINGS

FIG. 4 is a view illustrating the manually operated control members on the control panel of the paper cutting machine of FIG. 1;

FIGS. 5 and 6 illustrate the relative positioning and general arrangement of the phototransistor arrays provided in the feedback signal generator of the paper cutting machine of FIG. 1 to develop feedback signals particularly useful in the control system of FIG. 2;

FIG. 7 illustrates an aperture plate that cooperates with the incremental position phototransistor array of FIG. 5;

DETAILED DESCRIPTION

Figure 1:
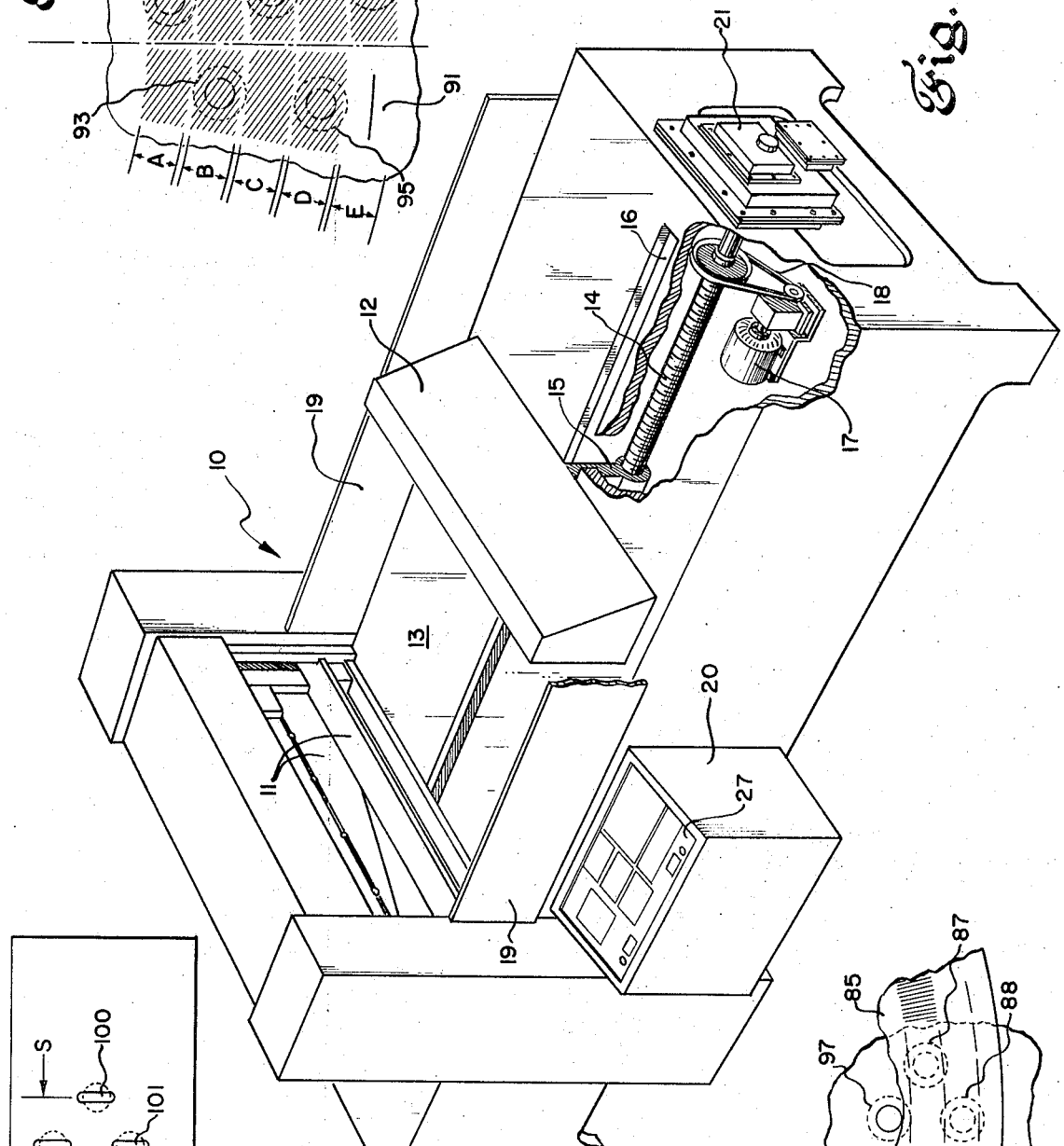
FIG. 1 is a schematic perspective view of a paper cutting machine incorporating the instant invention.

FIG. 1 illustrates a paper cutting machine 10 having a clamp/cutter assembly 11 and incorporating the control system apparatus of this invention. A backgauge assembly 12 is supported by table 13 of the cutting machine and is moved linearly by lead screw 14 for the purpose of advancing stacked paper into cooperation with assembly 11 for clamping and cutting. Lead screw 14 engages lug 15 attached to assembly 12. Lug 15 in part slides in slot 16 provided in table top 13. Also as shown in FIG. 1, electric drive motor 17, and pulley/belt subassembly 18 are provided in the paper cutting machine to controllably rotate lead screw 14 in alternate directions and thereby cause linear movement of backgauge assembly 12 to and from assembly 11. Conventional side guides installed in machine 10 are referenced by the numerals 19.

A control console 20 is provided for use by the machine operator and, other than for operating and program characteristics, is essentially of conventional design. Feedback signal generator means 21 is connected to lead screw 14 to develop input feedback signals for the machine servo control system to precisely and digitally position the machine backgauge assembly 12 at any selected position in the maximum or total range of backgauge assembly traverse along table 13. For example, apparatus 21 in combination with the closed loop servo control system of this invention has been used to precisely position a backgauge assembly such as 12 in increments to the nearest 0.001 inches of backgauge travel. In accomplishing such positioning, a digital command signal recorded on magnetic tape (see FIG. 4) in binary-coded form and an input feedback signal derived by operation of generator 21 are compared in the control system of FIG. 2 to measure error and to develop a control signal indicative of the precise degree of correction required. The input feedback signals generated by unit 21 have two parts. One part comprises a binary-coded digital signal identifying key control positions in the backgauge total range of traverse. The other input feedback signal part comprises digital counting pulses that are each indicative of an incremental position change intermediate to adjacent backgauge control positions.

Figure 2:
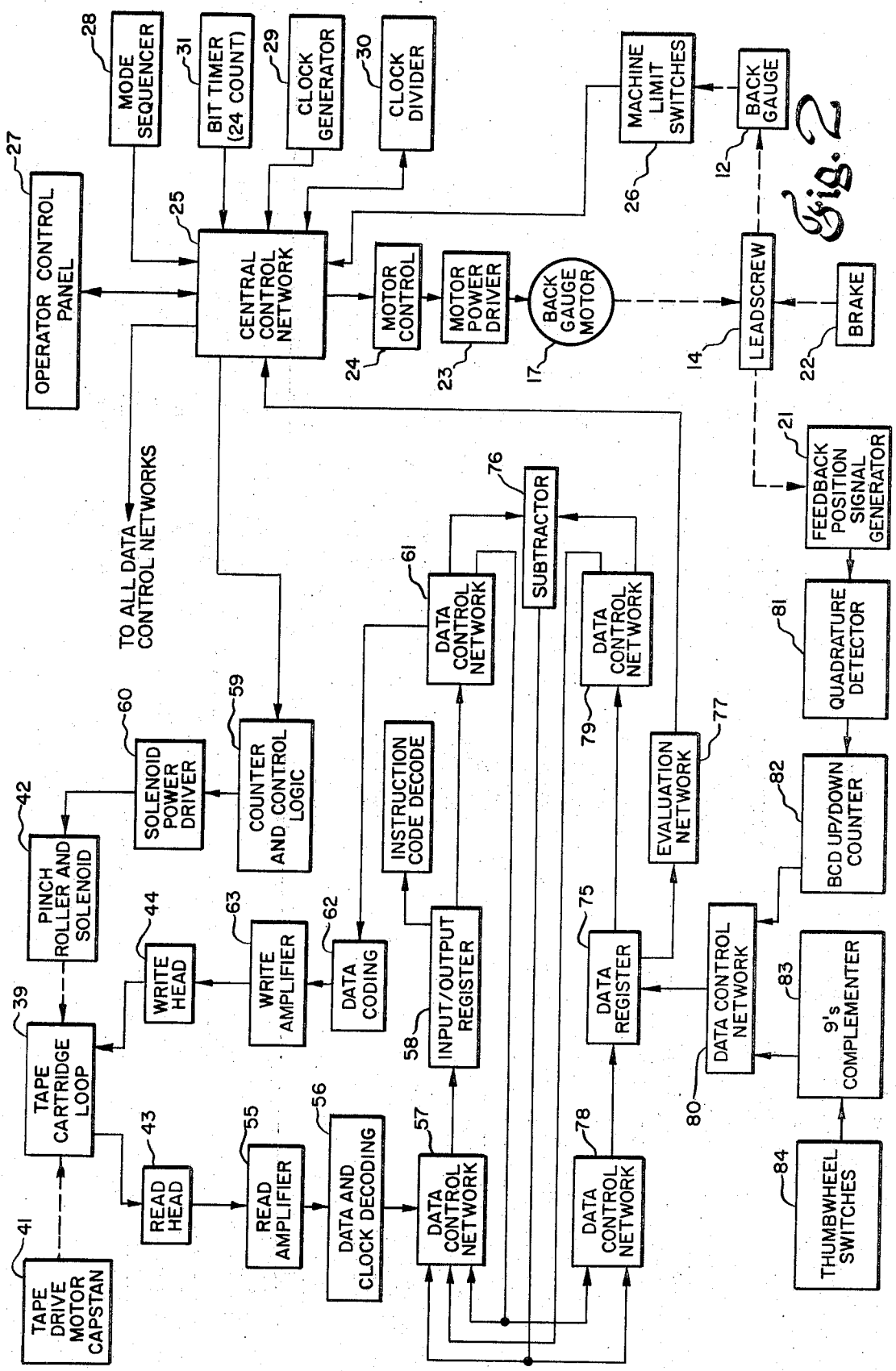
FIG. 2 is a functional block diagram of a preferred embodiment of the control system of the paper cutting machine of FIG. 1.

FIG. 2 illustrates, in functional block diagram form, the control system preferred for paper cutting machine 10 and its digitally positioned backgauge 12. As previously described, backgauge 12 is moved toward and away from different programmed or selected cutting positions by mechanical connection to lead screw 14 similar to that used in lathe tool feed devices. Lead screw 14 is turned by motor 17 through a mechanical connection in the form of belt/pulleys 18 or held in fixed position by an electromagnetic brake 22. Speed and direction of rotation of motor 17 is determined by the output of conventional motor power driver 23 which converts single or multiple phase power from a power line into variable voltage direct current or variable duty cycle alternating current as required. Motor control 24 converts signals that originate in the central control network 25 into a voltage and current form usable by the motor power driver 23. In one actual embodiment of the invention motor control 24 supplies a voltage that varies from −10 to +10 volts where −10 volts represents full speed reverse direction and +10 volts represents full speed forward direction and 0 volts represents stop. Various voltages appear at the output of motor control 24, depending upon the speed and direction established by the output of control network 25 and for at least certain paper cutting machines, backgauge control using full speed reverse, full speed forward, and three or four slower forward speeds may be desired. Logic signals originating in central control network 25 causes various transistors in the motor control 24 to switch the desired voltage at the input of the motor power driver 23.

The direction of rotation and speed of the backgauge motor 17 is determined by conditions established as a result of information delivered to the central control network 25 from various additional elements or segments of the control system. For example, conventional machine limit switches 26 supply signals that prevent the motor 17 from driving the backgauge beyond the mechanical limits of the cutter table 13. Functionally similar devices are used for hereinafter described control panel 27 so that the machine may be manually controlled by an operator as well as automatically internally.

The central control network 25 is also controlled by the mode sequencer 28 in order that machine 10 may be programmed from operating mode to operating mode in a pre-determined order of events until the desired end result is attained.

Mode sequencer 28 is essentially a string of flip-flops in a conventional form called a shift register. The outputs of shift register 28 may be decoded (each is unique and may be used to initiate or enable one step in a multistep process with the order of steps determined by the input data only) and in the case one actual embodiment of a four-stage (four-bit) mode sequencer 28 in paper cutting machine 10, the following 15 modes (steps) of operation were assigned in the sequence indicated:

Step 19. Idle
Step 5. Ready
Step 6. Write
Step 7. Read
Step 8. Delta
Step 9. Polarity check
Step 10. Reverse
Step 11. Fast forward
Step 12. Slow forward (magnitude less than 2)
Step 13. Slow forward (magnitude less than 0.4)
Step 14. Slow forward (magnitude less than 0.08)
Step 15. Slow forward (magnitude less than 0.04)
Step 16. Slow forward (magnitude less than 0.01)
Step 17. Brake
Step 18. Delta
Step 19. Idle The digital compenents of the FIG. 2 control system are regulated in time primarily by clock generator 29 which consists of a transistor multivibrator operating, in one preferred embodiment, at $2 \times 10^6$ cycles per second (2MHz.) followed by a flip-flop frequency divider producing 1MHz output that is used as control system principal signal. Clock divider 30 produces synchronized pulses at a number of lower frequencies to be used as needed in the system and for purposes hereinafter mentioned separately.

Since the FIG. 2 control system for paper cutting machine 10 is digital in basic routine and utilizes program commands inputted individually in the form of separate streams of data bits, it is necessary to provide a bit timer 31 for controlling transfer of data and appropriate serial positions in the command and also for controlling other system functions such as certain arithmetic procedures. An actual embodiment of the control system for machine 10, for example, utilizes 24-bit recorded commands that are each made up serially of a 4-bit program instruction followed by a 20-bit dimension or position instruction. Each position instruction is a conventional 1-2-4-8 weighted binary-coded decimal notation repeated through five decades representing one-thousandth, one-hundredth, one-tenth, unit, and tens levels to then give the machine a total traverse capability of essentially 100 units (in inches, for example) with a resolution of one-thousandth unit. For the purpose of controlling instruction transfers and keeping the data bits in sequential groupings, bit timer 31 is provided in the form of a conventional ripple counter with a 24 count output occurring once each 24 cycles of the main system clock pulse that is produced by clock generator 29 at the stated 1 MHz frequency.

A general understanding of the remaining portion of the FIG. 2 backgauge positioning control system for machine 10 is best developed with features of the FIG. 4 operator control panel 27 in mind. Some of the basic functions accomplished by conventional electrical or electronic switching are power on or off by switch 32, mode of machine operation (manual, program, or automatic) by selector switch 33, and manual control of backgauge positioning through motor 17 by push-button switches 34 and 35 for forward and reverse directions, respectively, and stopping push-button switch 36. Operation of the cutting machine clamp/cutter assembly 11 is, for personnel safety reasons, initiated only by two-handed manual operation of paired and separated push-button switches 37 after correct positioning of the backgauge (and paper stock) is indicated by indicator lights 38.

Control of machine 10 in its automatic mode of machine operation is accomplished by use of operation instructions recorded or programmed on endless or continuous loop magnetic recording tape 39 stored in removable conventional tape cartridge 40. The tape deck portion of panel 27 includes a drive motor capstan 41 that cooperates with tape 39 through pinch roller 42 and that moves tape 39, but only when the tape is programmed by sequencer 28 for reading or writing operation, past read and write heads 43 and 44 in that sequence. Pinch roller and solenoid 42 is engaged with tape 39 (and drive capstan 41) and the tape accelerated to proper reading speed in response to an activating signal from central control network 25 that is processed through counter and control logic 59 to operate power driver 60 for the pinch roller solenoid.

The PROGRAM mode of machine operation established by selector switch 33 is primarily to permit operator-modification of the program previously recorded on tape 39 for obtaining automatic operation or to permit the writing of automatic operation instructions on blank tape. Such is accomplished in part through selective operation of push-button switches 45 through 54 which are illustrated by way of examples of function that can be achieved if desired. For instance, if the operator wished to completely remove all data recorded on tape 39 he operates ERASE switch 49. If only a given individual instruction is to be removed from tape 39, push-button switch 48 (DELETE) is operated. If he wishes tape 39 to be positioned in cartridge 40 at a position to present the first program instruction to head 43 on subsequent re-use he operates REWIND push-button switch 51. The remaining switches for programming are believed to be self-explanatory and from a functional standpoint all are believed to be essentially conventional in individual routine. Still other programming functions can be added, if necessary.

With the significance of the programmable tape 39 and manual controls of control panel 27 in mind, the significance of the remaining portions of the control system of FIG. 2 becomes more apparent as developed in the following description. All of the program instruction data so far described is normally the form used in 5 volt logic where a logic zero is represented by 0 to 0.8 volts and logic 1 is represented by 2.0 to 5.0 volts. Due to the nature of magnetic recording on tapes such as 39, and particularly because of the well-known time-derivative effect on playback, it is not convenient or economical to record such data directly as it is used in the closed loop digital servo system for controlling the position of backgauge 12. Instead the command data bits are used to switch a 1 KHz signal on and off at times determined by program timing considerations and optimum recording/playback parameters.

When tape 39 is played, read head 43 senses the magnetic variations on the tape and converts them to small voltages. The small voltages developed by read head 43 are amplified by the read amplifier 55. Current techniques lean toward the use of an integrated circuit operational amplifier because of cost advantages, but any gain block device or devices may be used. Data and clock decoding function 56 converts the amplified signal to the standard logic levels and separates the data bits from the clock intervals by evaluating the signals at the proper time.

The data modulated 1 KHz signal entering 56, if a logic 0, is represented as 10 milliseconds of modulation starting at the beginning of a time period of 20 milliseconds and; a logic 1 is represented as 10 msec. of modulation starting 10 msec. before the period. Modulation is always either turned on or turned off every 20 msec., as provided by a 50 Hz clock timing. Assuming tape speed is reasonably the same during reading, playing of the tape can be expected to reproduce the modulation transitions at 20 msec. intervals. When data bits adjacent to each other are the same, modulation is turned on and off at 10 msec. intervals. To avoid interpreting the in-between transitions as clock or data information, a 15 msec. timer in module 56 disables the clock decoding circuit for 15 msec. after any given clock pulse. The 15 msec. timer, for instance, may be comprised of eight flip-flops connected in a ripple counter configuration and driven by a 10 KHz clock pulse output from the clock divider 30. A simple gate circuit senses a count of 150 pulses of 0.1 msec. period. Data and clock signals from module 56 flow through data control network 57 and into the input/output register 58. This action completes the example Step 7 of mode sequencer 28, for instance.

Instruction data to be entered on tape 39 during operation of machine 10 in the PROGRAM mode established by selector switch 33 and temporarily stored in register 58 is gated by data control network 61 at an appropriate time for coding in module 62, amplification to a recordable voltage level in write amplifier 63, and placement on magnetic tape 39 by write head 44. The remaining block functions of FIG. 2, as well as input/output register 58 and cooperating data control network modules 57 and 61, basically comprise the critical control means whereby the improved performance of cutting machine 10 is obtained and are described in greater detail below. Much of the digital logic hardware for accomplishing the novel manner of position control for backgauge 12 is illustrated schematically in FIG. 9 and also is described in greater detail below.

Figures 3, 8:
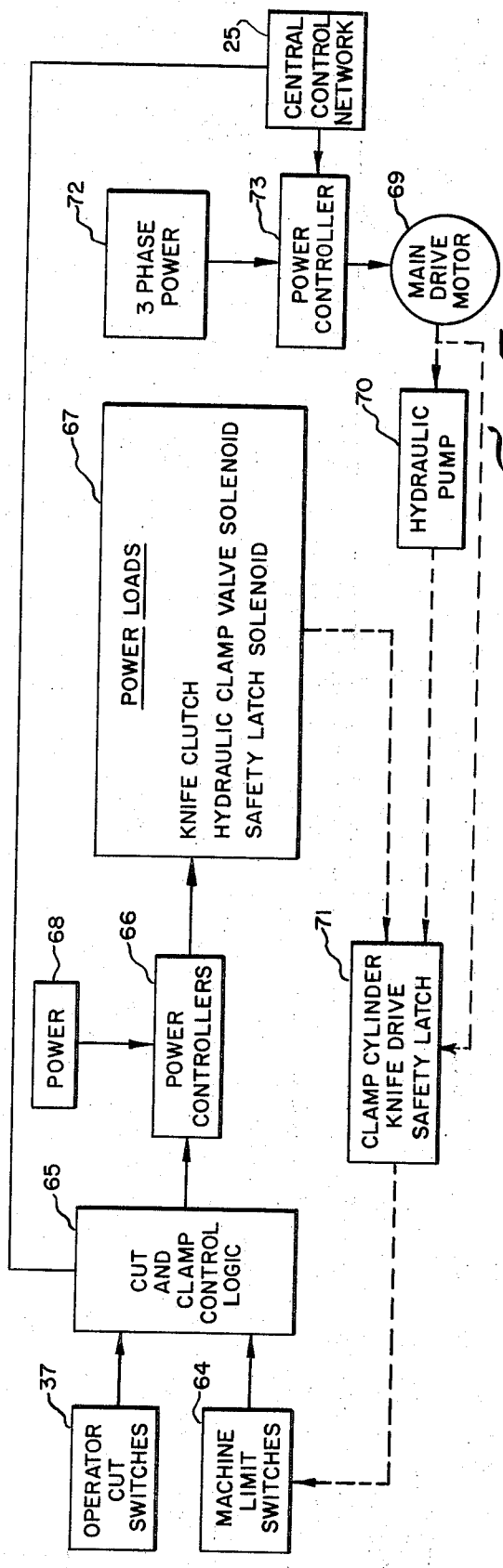
FIG. 3 is a functional block diagram illustrating the relationship of auxiliary powered elements of the paper cutting machine of FIG. 1 to the control system of FIG. 2.
FIG. 8 is a table detailing the binary-coded position information developed by the backgauge control position phototransistor array of FIG. 6.

The blocks shown in FIG. 3 represent the cutting controls for machine 10. No backgauge positioning or other computation is involved, only the sequential combination of signals from switches shown as operator cut switches 37 and machine limit switches 64. The cut and clamp control logic function 65 issues signals to the power controllers 66 so as to energize the power loads 67 with energy from power supply 68. The cutting and clamping work forces are delivered by main drive motor 69 through the hydraulic pump 70 and a gear box with the cooperation of the machine clamp cylinder, safety latch, and knife drive 71. Suitable signal interlocks (not shown) connect the cut and clamp logic 65 with central control network 25. That portion of the control system for paper cutting machine 10 illustrated in FIG. 3 is considered to be entirely conventional as are the power supply 72 and power controller 73 for hydraulic pump drive motor 69 actuated from central control network 25.

The previously-mentioned remaining functions of the FIG. 2 control system essentially comprise the novel closed-loop servo system for precisely controlling the positioning of backgauge 12 and like any servomechanism two information inputs are generally needed; (1) the desired or command position which in the FIG. 2 arrangement is stored in binary data form in input/output register 58 from tape loop 39, and (2) the current or actual backgauge position which in the FIG. 2 arrangement is stored in binary data form in data register 75. Binary data subtractor 76 compares the command and actual position binary data, detects any difference which exists, and provides the difference to data register 75 and evaluation network 77 whereby the difference direction (polarity) and magnitude are inputted to central control network 25 to ultimately drive leadscrew 14 and backgauge 12 to the command or zero difference position. Data control networks 57, 61, 78, and 79, as well as data control network 80, function as conventional distribution switches. See FIG. 9 for typical logic module construction. The binary data delivered to the data control network output in each instance is controlled or selected, largely on a time-coincident basis, by control logic output signals from central control network 25.

In order that the closed-loop servo control system of paper cutting machine 10 might obtain precision positioning of backgauge 12 with the accuracy of a system having a feedback position absolute encoder but with the performance, repeatability, reliability, and low cost of a feedback position accumulative counter scheme, the arrangement of FIG. 2 is provided with a novel feedback position signal generator 21 and cooperating logic circuits 81 and 83 that originate and appropriately process a feedback position information signal that is an accumulated count of incremental position pulses periodically checked and corrected at precise reference positions in the backgauge total traverse length. Details regarding a preferred form of signal generator 21 and also regarding its cooperation with quadrature detector 81, counter 82, data control network 80, and data register 75 are provided in FIGS. 5 through 9 of the drawings.

Figure 9:
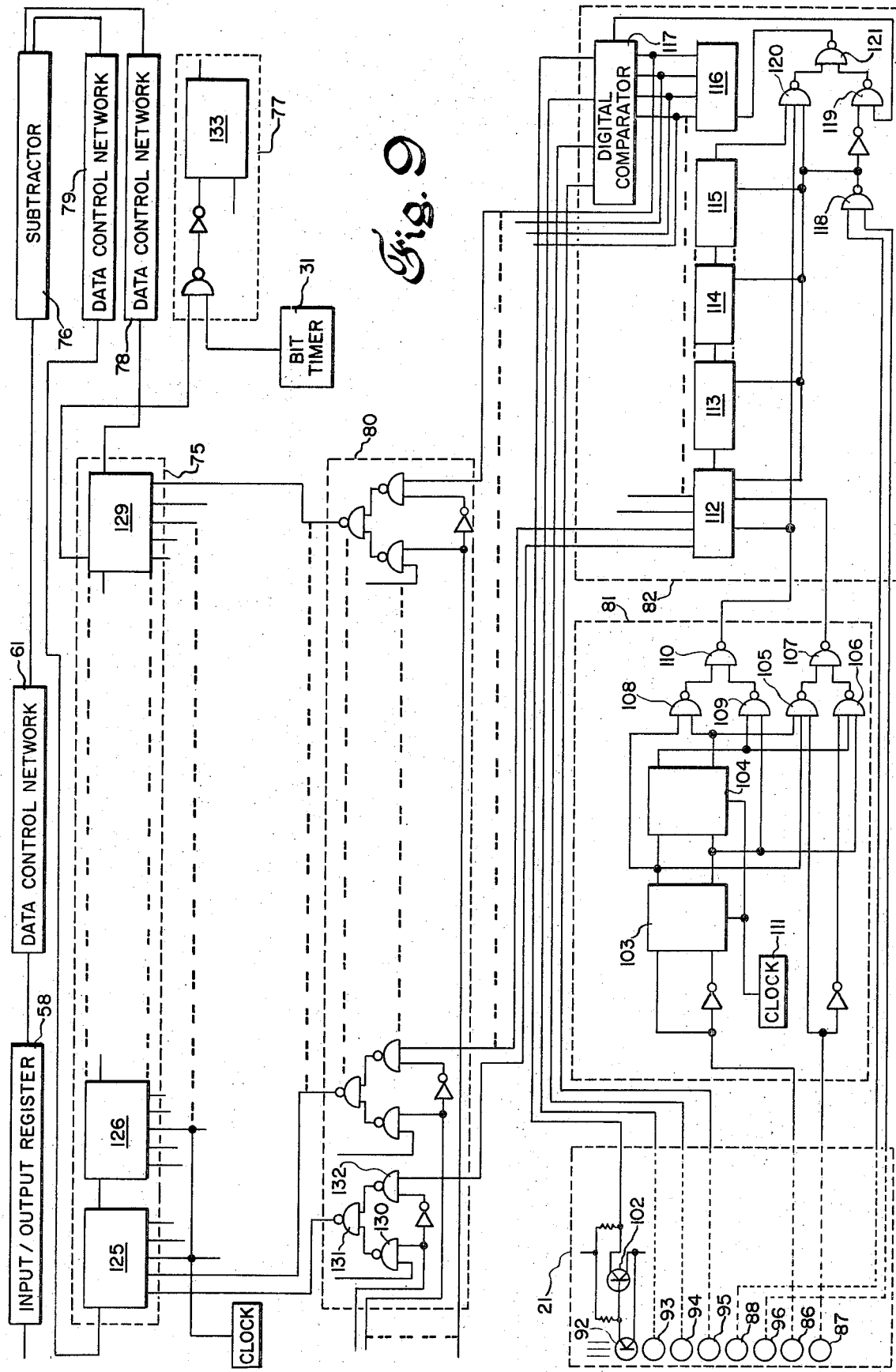
FIG. 9 is a schematic logic diagram of a portion of the control system illustrated in FIG. 2.

Feedback position signal generator 21 is described and claimed separately in pending application Ser. No. 200,868, filed Nov. 22, 1971 and assigned to the assignee of this application. However, FIGS. 5 through 8 are included in the drawings of this application to detail some of the more important construction and operational characteristics of such generator means that are helpful to a complete understanding of the FIG. 2 control system and of the operation of quadrature detector 81 (FIG. 9). Basically, signal generator means 21 is comprised of two transparent marking discs (85, 91) that are mechanically coupled to and driven by lead screw 14. Such marking discs, in combination with an appropriate direct current light source and cooperating phototransistor detector arrays, develop a feedback position information signal comprised of incremental position pulses for counting and periodic binary-coded pulse signals for indicating backgauge location at a precise reference or key control position in the total length of backgauge traverse. In one actual embodiment of signal generator means 21 a transparent counting pulse disc 85, shown fragmentally in FIG. 5, cooperates with phototransistors 86 through 88 shown in outline and with a direct current lamp source (not shown). Disc 85 is mechanically rotated relative to the phototransistor detector array by lead screw 14 (at a rate of 1 revolution per 1 inch of traverse of backgauge 12, for example), has spaced-apart opaque stripes 89 (500 in the total circumferential zone of disc 85 to develop 1,000 counting pulses per revolution, for example) whose edges are uniformly spaced, has a strobing opaque stripe 90 (one in each circumferential extent of disc 85, for instance), and drives a cooperating transparent binary-coded marking disc 91 (FIG. 6).

Disc 91 makes one revolution per total traverse of backgauge 14, for example, is rotated by disc 85 about the same rotation axis in a fixed ratio through a geared connection (1 revolution of disc 91 per 100 revolutions of disc 85, for example), and cooperates with phototransistor detectors 92 through 96 as hereinafter explained. Disc 91, at uniformly spaced radial positions throughout its circumferential extent, is provided with different patterns of opaque areas for cooperation with the array comprised of phototransistor devices 92 through 96. In the referenced actual embodiment of this invention, disc 91 in signal generator 21 was provided with 10 different binary-coded patterns centered at intervals of 36°. Each binary-coded pattern at radial zones A through D designates a different reference position, for instance positions at 10 inch intervals in the total length of backgauge traverse. The "truth" table of FIG. 8 gives the different bi-level logic signals developed at the phototransistor array for the different key position patterns. The opaque area in the radial zone of disc 91 designated E cooperates with phototransistor 96 for purposes of precisely locating each of the key reference positions by producing an output pulse signal at phototransistor 96 that is used on a concurrent basis with the strobing pulse signal produced by phototransistor detector 88 in cooperation with opaque stripe 90.

In both cases of marking disc 85 and marking disc 91, light from the generator means 21 lamp either passes to or is blocked from various aligned phototransistor detectors 86 through 88, 92 through 96, and 97 by reason of the transparent/opaque areas of the disc, and thus enables or inhibits an output signal from the various cooperating phototransistors. The output signals developed by counting pulse disc 85 for quadrature detector circuit 81 (FIG. 9) are advantageously developed using an aperture plate 98 (FIG. 7) having apertures 99 through 101, for example, which are each slightly smaller in dimensional extent than the individual stripes 89 or 90 in registration with such apertures and the cooperating phototransistors 86, 87 and 88. It is important that in a circumferential sense aperture openings 99 and 100 be spaced apart a distance S which is an odd multiple of one-half a space width of the space width which separates the uniformly spaced-apart edges of opaque stripes 89. As will be hereinafter explained, such an aperture spacing is useful in developing an output signal indicative of direction of change as well as the detection of each incremental unit of change of position of backgauge 12. Elements 85 through 101, therefore, function to develop as the outputs from the phototransistor detector devices output information signals indicating: (1) each incremental change of position of backgauge 12 as indicated by an incremental change of rotational position by disc 85, (2) direction or sense of such incremental changes, and (3) presence of backgauge 12 at different precise reference positions in the total length of backgauge traverse. The 0° and 360° binary-coded reference positions (FIG. 8) correspond at strobing to the 0 inch and 100 inches precise positions of the backgauge in the total length of backgauge traverse. (A limit switch may be used to inhibit motor 17 and lead screw 14 from further movement at a position approaching approximately a 100 iches total movement position.) The intermediate 36°, 72°, etc. reference positions correspond to precise 10 inches intervals in the total length of backgauge traverse. Phototransistor 97 is employed in the apparatus to indicate failure of the generator means 21 light source so as to promptly inactivate the total system. Since in the referenced actual embodiment example disc 85 makes 10 revolutions (10 inches of backgauge travel) during each radial interval of the 10 binary-coded patterns on disc 91, it is important that the circumferential extent of the opaque that cooperates with the phototransistor 96 be less than two-tenths of the 36° interval. In the case of the actual embodiment, the circumferential extent of the opaque area was approximately 3° thus preventing the possibility of two strobe pulses being developed by phototransistor detector 88 during any one binary-coded key control position pattern on disc 91.

As lead screw 14 is rotated in different directions by motor means 17, concurrent series of pulses are developed by phototransistor 86 and by phototransistor 87 of signal generator means 21. The different series of pulses are each essentially comprised of square waveform pulses of a given voltage value alternated by equal periods of zero voltage and are 90° out of phase with respect to each other. The phase lead/lag relationship between the different pulse series changes whenever the direction of rotation of counting pulse disc 85, and therefore lead screw 14, is changed.

The different series of square waveform pulses produced by phototransistors 86 and 87 are the input pulses to quadrature detector 81 (FIG. 9). As shown in the drawings, such quadrature detector 81 is essentially comprised of flip-flops (conventional bistable multivibrators) 103 and 104 forming a two-stage shift register and Nand gates 105 through 110. Timing pulses from clock 111 are utilized to control the transfer of data in the shift register. Clock 111 should produce timing pulses at a repetition rate greater than the frequency of the pulses produced by phototransistors 86, 87 by a small factor such as 5. In one actual embodiment of machine 10 the control signal of clock 111 had a frequency of 1 Mhz for leadscrew movements producing phototransistor pulses at a maximum frequency of 8 Khz.

In the FIG. 9 arrangement the variation in light intensity of light falling on each of phototransistors 86 through 88, 92 through 95, and 96 changes the resistance from collector to emitter and produces a low voltage signal that is amplified in each instance by a signal amplifier 102 to a suitable voltage level for the subsequent logic circuits. The outputs of quadrature detector 81 then are a series of counting pulses produced at Nand gate 110 and direction indication pulses produced at Nand gate 107. A positive (logic 1) pulse from gate 107, for instance, causes the 1 microsecond counting pulses from gate 110 to increment counter 82; a relatively zero (logic 0) pulse from gate 107 in the same embodiment causes the counting pulses from gate 110 to decrement counter 82.

The counting pulses developed at Nand gate 110 and the count direction (up/down [forward/reverse]) control pulses developed at gate 107 of quadrature detector 81 are inputted to counter 112 which is the first or least significant bit counter. Counters 112 through 116 are each comprised of conventional cascaded flip-flop circuits and their outputs are in conventional 1-2-4-8 weighted binary-coded-decimal representation. Counter 112, in the referenced machine embodiment, for example, counts changes of 0.001 inch in backgauge position. Counter 113 is for the next significant decade (hundredths), decade counter 114 for tenths, decade counter 115 for units, and the last decade counter 116 in the string for counting multiples of ten. The four most significant bit outputs of counter 116, accordingly, are for values of 10 inches, 20 inches, 40 inches and 80 inches in the referenced actual machine embodiment.

The phototransistor devices 92 through 95 of signal generator 21 that cooperate with binary-coded disc 91 (FIG. 6) provide binary-coded position information inputs to the digital comparator section 117 of binary-coded-decimal up/down counter 82. In addition, strobing pulses developed at phototransistor 88 in cooperation with signal generator disc 85 and at phototransistor 96 in cooperation with signal generator disc 91 are inputted to Nand gate 118 to control the comparison and compensation function accomplished within counter 82. In the referenced machine embodiment, a strobing pulse is developed by phototransistor 96 in a relatively narrow position range including the precise position at each key reference or control position in the range of traverse of backgauge 12 and another strobing pulse is developed by phototransistor 88 precisely at each key reference or control position for the backgauge.

Normally when gate 118 is enabled by an enabling signal from phototransistor 96 and concurrently activated by an activating signal from phototransistor 88, the stored count in counter 116 should agree with the binary code input to digital comparator 117 from phototransistors 92 through 95 and compensation of the system for error is not in order. In the event an error does exist, however, compensation of counters 112 through 116 will be automatically accomplished. If a stored count of 19.995, for example, should exist in counters 112 through 116 relative to a binary coded key reference value of 20 inputted from signal generator 21 to digital comparator 117, gates 118 through 121 are enabled and counters 112 through 115 are reset to zero. Counter 116 then continues to increment until its value becomes the binary-coded value of 20 established in comparator 117 by signal generator 21. Gates 119 and 121 are then disabled by the output of comparator 117 indicating a zero difference between inputs. In the event a digital value of 20.005 for example is stored in counters 112 through 116 at the time of counter comparison initiation by the strobing pulses from phototransistors 88 and 96, gates 119 through 121 (disabled by the zero-difference-indicating output of digital comparator 117) cause the active output of gate 118, essentially a "reset to zero" signal to be inputted to counters 112 through 115 to reset the counter to a zero output condition. Since all counter storage is volatile and disappears with power off, the whole number strobing procedure must occur whenever machine 10 is started. Special control circuitry in central control network 25, independent of the counter scheme, is provided to cause the lead screw drive 14 to run backgauge 12 at first backwards and then forwards if necessary until strobing of counters 112 through 116 by the output of gate 118 is accomplished.

The backgauge position closed-loop servo control system illustrated in FIG. 2 further includes a data register 75 schematically illustrated in FIG. 9. Data register 75, in the referenced machine embodiment, for instance, is a series of 20 conventional flip-flop circuits each provided with a capability for receiving a different data bit of the system instruction. In FIG 9, register sections 125 through 129 of register 75 for receiving dimension or position instruction information are illustrated in block form. Each section is capable of receiving four different digital bits. The binary-coded decimal backgauge position information stored in counters 112 through 116 at any given time are loaded into the corresponding flip-flop circuits of sections 125 through 129 of register 75 through data control network 80 all bits at once. In addition, position information developed by thumbwheel switches 84 after processing through a conventional 9's complementer circuit 83 may also be stored in the position information sections of data register 75 through selective operation of data control network 80. As shown in FIG. 9 representative or typical data control network 80 (which as previously-mentioned is essentially a distribution or switching network) may be comprised of Nand gate combinations such as the Nand gates 130 through 132 repeated for each bit position in data register 75. Data control networks 57, 61, 78, and 79 are constructed and function in the same general manners as those of network 80. The active bits of digital information placed in data register 75 (as from counter 82, for example) are essentially loaded as a result of enabling signals being provided from central control network 25 or other system sources.

The input/output register 58 included in the backgauge closed-loop servo control system for machine 12 is identical in logic function to data register 75. However, the primary use of input/output register 58 is to store digital information that is to be written onto tape loop 39 by processing through data control network 61 and write head 44 or is to be subsequently processed after receipt from read head 43 by way of data control network 57. It should be noted at this point that the two items of information necessary for precision operation of the servo system, that is command or required position information and actual or current position information, are concurrently stored in register 58 and register 75, respectively. The further movement required of backgauge 12 at any time is determined by a comparison of the position information stored in the two registers. In the arrangement of this invention, the comparison is accomplished by developing the binary differences between the two stored values and evaluating the sign and the magnitude of the differences, if any. A conventional binary subtractor circuit 76 is provided to produce the difference. Such devices are combinations of shift registers, gates and flip-flops and are described in the literature: Paul M. Kintner, Electronic Digital Techniques, 1968; Signetics, MSI Specifications Handbook Volume II; and others. In a specific case of a position evaluation, the binary-coded decimal number in data register 75 becomes the minuend and the binary-coded-decimal number in input-output register 58 becomes the subtrahend of the subtraction. A positive signal on the output difference of circuit 76 means that backgauge 12 is to the rear of the command position and should be driven forward. If the sign of the output difference is negative, indicated by the storage of a borrowed term in a flip-flop, then the command position is rearward of the backgauge current position and it must be driven in reverse. While the difference is being entered into data register 75 through data control 78, evaluation network 77 provides signals to the central control network 25. For example, in previously-listed mode sequence Step 9, the subtractor 76 output difference is checked for sign (also called polarity). If the sign is negative, the central control network 25 will advance mode sequencer 28 to Step 10 causing suitable signals to operate the motor 17 in reverse direction. If the sign of the subtractor 76 output difference is positive, immediately the following reverse mode (Step 10) exists for too short a time to cause any reverse motor activity and mode sequencer 28 will therefore further advance to Step 11 - Fast forward. Step 11 in the specific embodiment example will exist until the subtraction difference decreases to a magnitude of less than 2 inches.

Subtraction cycles occur on a continuous basis, once every $24 \times 10^{-6}$ seconds (24 usec.). At the start of each subtraction cycle, the encoder counter outputs are loaded into data register 75. As the subtraction continues, bit-by-bit, the bit timer 31 provides signals related to the weight or value in inches of data in specific places in the data register 75. For example a data bit with a weight of 2 inches moves 13 places in register 75 when it enters the subtractor 76 input, and four places after subtraction to the register section 129 point where evaluation circuitry 77 is connected. Therefore, to determine whether a binary number is equal to or larger than 2 inches it is only necessary to examine the difference data from the time at which the 2 inches bit appears at the point of evaluation until the end of the subtraction cycle. If a logic 1 appears, it indicates that the difference is equal to or greater than 2 inches. Circuitry to perform that function is shown as 77 in FIG. 9, highly simplified. The output of the single flip-flop 133 is used to change the mode sequencer 28 to the next step. For example if the control is in Step 11 - Fast forward, and the subtraction difference is 2.001, Step 11 will continue. Two thousandths of an inch later in backgauge 12 travel, the difference becomes 1.999 and the mode sequencer 28 is changed to Step 12 - Slow forward, and remains so until the difference becomes less than 0.400 inches, and so on. When the difference becomes 0.000, mode sequencer 28 is changed to Step 17 - Brake, and the lead screw brake 22 is energized causing all motion of backgauge 12 to stop. Motor power driver 23 is also turned off in the same step.

Referring to FIGS. 2 and 4, thumbwheel switches 84 are placed on the operator's control station to provide a manual data entry facility that may be used to modify the command position information. In many operating situations the dimensions originally used when the tape cartridge loop 39 was programmed, do not exactly fit the printed stock that is to be cut. In these cases, it is not desirable or necessary to reprogram because the next load of paper stock may not require correction. Each thumb wheel contains the equivalent of three or four rotary switches, the outputs of which are connected to a common wire in a pattern described by a table of binary valves. Three switches are used in combination to provide a correction capacity of 0.999 inch in 0.001-inch increments, in either direction. When the need for correction arises, the operator estimates the dimension of the correction and sets the thumb wheel switches accordingly. During programmed Step 8 - Delta, the thumb wheel dimension data is loaded into the data register 75. Since the tape command data is in the input/output register 58, a subtraction cycle then generates new data that represents the numerical difference. This new data is placed in the input/output register 58, through data control network 57. When positioning computations start in successive modes, the modified command data is used. The correction needed may be such as to increase or decrease the tape command so provision is made to subtract the thumb wheel data directly causing a smaller command number. Alternatively, the thumb wheel data may be complemented from 9 by 9's complementer 83 and then subtracted, the effect being that of a double negative sign which results in addition. Regardless of which polarity of correction is required, at the end of positioning, Step 18, the process is reversed and the thumb wheel data is added to or subtracted from the data stored in the input/output register 58.

The complementer 83 is a simple network of logic gates and appears commonly in the literature of the art. During all numerical computations in the FIG. 2 system, all program instruction bits are held in the respective registers 58 and 75 without circulating. Only the 20-bit position information/instruction data stream is circulated.

I claim:

1. In a machine having a work positioning member moved by leadscrew means throughout a total length of positioning member traverse and cooperating closed-loop servo control means regulating movement of said leadscrew means in response to summation of a command signal and a concurrent positioning member position feedback signal, in combination:

signal generator means mechanically coupled to said leadscrew means and producing in response to movement of said leadscrew a unique output binary-coded signal for each one of different precise key reference positions established in said positioning member length of traverse and an output pulse signal for each uniform incremental change of positioning member position intermediate said precise key reference positions adjacent each other;

incremented/decremented digital resettable counter means receiving said incremental change pulse signals from said signal generator means and counting said pulse signals to produce an output binary-coded signal corresponding in magnitude to the sum of said incremental change pulses received thereby subsequent to resetting;

comparator means receiving one of said signal generator means unique binary-coded signals and said counter means output binary-coded signal when said positioning member is at one of said precise key reference positions and producing an output signal indicative of a difference in magnitude that exists therebetween; and compensation circuit means compensating said counter means in response to said comparator means output signal when said received unique binary-coded signal differs in magnitude from said counter means output binary-coded signal at said one positioning member precise key reference position and until zero difference exists between said received signal generator means unique binary-coded signal and said counter means output binary-coded signal, said digital counter means output binary-coded signal further comprising the concurrent feedback position signal of said machine closed-loop servo control means.

2. The invention defined by claim 1 wherein said digital counter means comprises flip-flop circuits cascaded in a sequence of groups from a least-significant bit group through a most-significant bit group and in a ripple counter configuration, said counter means output binary-coded signal being loaded into said comparator means from said most-significant bit group only.

3. The invention defined by claim 2 wherein said combination further comprises strobing circuit means producing a precision marking pulse only at each precise key reference position in said positioning member length of traverse and not at positioning member positions intermediate adjacent key reference positions, said strobing circuit means precision marking pulse resetting said digital counter means at all said flip-flop circuit significant bit groups other than said most-significant bit group and enabling incrementing compensation of said digital counter means flip-flop circuit most-significant bit group by said signal generator means output pulse signals when said comparator means produces an output signal indicative of a difference in magnitude between the said signal generator means received unique binary-coded signal and said counter means output binary-coded signal.

4. In a method of minimizing the accumulation of error in a machine closed loop servo control system regulating the movement of a work positioning member throughout a total length of positioning member traverse by connected leadscrew means and in response to the summation of a binary-coded command signal and a concurrent positioning means binary-coded position feedback signal, the steps of:

generating a unique binary-coded signal for each one of different precise key reference positions in said positioning member length of traverse;

generating an incremental change pulse signal for each uniform change of positioning member position intermediate said precise key reference positions;

counting said incremental change pulse signals during the time interval of positioning member movement intermediate successive of said precise key reference positions;

converting said counted incremental change pulse signals to a binary-coded count signal corresponding a magnitude to the sum of said counted incremental change pulses;

comparing said precise key reference position unique binary-coded signal and said binary-coded count signal and producing an output difference signal indicative of any difference in magnitude that exists therebetween;

utilizing said output difference signal to cause a changing of the count of said counted incremental change pulse signals and said binary-coded count signal until said binary-coded count signal corresponds to one of said precise key reference position unique binary-coded signal at each precise key reference position; and inputting said binary-coded count signal into said servo control system as said binary-coded position feedback signal.

* * * * *